3,542,732
ORGANOPOLYSILOXANES STABILIZED WITH
TETRACYANOETHYLENE
John D. Austin and Ronald H. Baney, Midland, Mich.,
assignors to Dow Corning Corporation, Midland, Mich.,
a corporation of Michigan
No Drawing. Filed Aug. 28, 1968, Ser. No. 755,818
Int. Cl. C08g 51/60
U.S. Cl. 260—45.9                                   3 Claims

ABSTRACT OF THE DISCLOSURE

Tetracyanoethylene is added as a stabilizer to organopolysiloxanes of general formula $$R_xSiO_{\frac{4-x}{2}}$$

where R is a monovalent hydrocarbon or halogenated hydrocarbon radical and $x$ has a value of from 0 to 3; $x$ having an average value of at least 0.5.

---

This invention relates to a method of enhancing the thermal stability of organopolysiloxane compositions.

Organopolysiloxane fluids, greases, resins and elastomers are well known articles of commerce. These materials are noted for their thermal stability, inertness, retention of physical properties over a wide range of temperature, and the like.

Although the organopolysiloxanes are in general more thermally stable than their conventional organic counterparts, it is desirable to enhance this superiority. A number of additives have been used for this purpose, but some such additives have an adverse effect on one or more of the other desirable properties of the siloxane composition.

It is an object of the invention to provide organopolysiloxane compositions of improved thermal stability.

According to the invention there is provided a method of stabilizing organopolysiloxane compositions comprising adding to the siloxane from 0.1 to 5 weight percent, based upon the weight of organopolysiloxane, of tetracyanoethylene.

Tetracyanoethylene, a well known compound, is described in detail in U.S. Pat. 3,166,584. This patent describes the preparation of tetracyanoethylene by reaction of sulfurmonochloride with malononitrile. Another patent, U.S. 2,794,824, describes preparation of the compound by reaction of dihalomalononitrile with a metallic reactant, such as copper.

The organopolysiloxanes which can be stabilized by the addition of from 0.1 to 5 weight percent of tetracyanoethylene include any organopolysiloxane fluid, resin or elastomer. Generally these siloxanes consist of units of the formula $$R_xSiO_{\frac{4-x}{2}}$$

In this formula R can be any monovalent hydrocarbon radical and/or halogenated monovalent hydrocarbon radical and $x$ has a value of from 0 to 3. The average value of $x$ in the polymer should be at least 0.5. The R radical attached to each Si atom can be the same or different and the same or different radicals can be attached to the various Si atoms in the polymer. Thus, the polymer can contain $RSiO_{1.5}$, $R_2SiO$ or $R_3SiO_{.5}$ units singly or in any combination. $SiO_2$ units can also be present in any combination with these units so long as the average R/Si ratio is at least 0.5.

Examples of suitable R groups include alkyl radicals such as methyl, ethyl, isopropyl, tert-butyl, 2-ethylhexyl, dodecyl, octadecyl and myricyl radicals; alkenyl radicals such as vinyl, allyl, decenyl and hexadienyl radicals; cycloaliphatic radicals such as cyclohexyl, and cyclohexenyl radicals; aryl radicals such as phenyl, napthyl and xenyl radicals; aralkyl radicals such as benzyl, phenylethyl and xylyl radicals and alkaryl radicals such as the tolyl and dimethylphenyl radicals. The monovalent hydrocarbon radicals can be halogenated to give radicals such as chloromethyl, 3,3,3-trifluoropropyl, 3,3,4,4,5,5,5-heptafluoropentyl, perchlorophenyl, 3,4 - dibromocyclohexyl, α,α,α - trifluorotolyl, 2,4 - dibromobenzyl, difluoromonochlorovinyl and α,β,β-trifluoro-α-chlorocyclobutyl radicals.

The described organopolysiloxanes are well known and many are commercially available materials. It is to be understood that the siloxanes employed herein contain not only the defined polymeric units, but can also contain minor amounts of similar units in which the silicon atoms have unhydrolyzed groups, such as Cl and alkoxy, attached thereto as is conventional in commercial products. Generally, the siloxane polymers are endblocked with silicon-bonded groups such as the alkyl, aryl, alkoxy, acyloxy groups.

Many organosiloxane polymers also contain typical organic polymeric units therein (e.g., the "silicon-alkyd" resins), or contain functional organic radicals attached to some of the silicon atoms, or contain cross-linking substituents derived from such functional groups. Such polymers are extensively described in the literature. These too are operative and are considered within the scope of the invention.

Specifically excluded from the scope of the invention are organosilicon compounds which contain strained siloxane or strained silazane bonds, such as are present in

and $(R'_2SiO)_3$ where R' is a monovalent aliphatic hydrocarbon radical. Also excluded are organopolysiloxanes which contain ≡SiOH groups. As disclosed in U.S. Pat. 3,304,271, tetracyanoethylene acts as a condensation catalyst when in contact with organosilicon compounds containing the strained bonds or silicon-bonded hydroxyl groups. Such polymerization is, of course, undesirable in the present invention since there would be a change in physical properties of the polymer.

The organopolysiloxanes per se assume the form of fluids, resins or elastomers, depending upon their average degree of substitution (R/Si ratio) and upon the type of R radicals present. Enhanced thermal stability is obtained by adding the tetracyanoethylene to these materials themselves, however, the invention is inclusive of organopolysiloxane-tetracyanoethylene mixtures which contain other additives. For example, when a grease thickening agent is added to the stablized fluid, the enhancement of themal stability is carried over to the grease. A large number of suitable grease thickeners for silicones are documented in the literature and suitable examples include metallic salts of fatty acids, soaps of hydroxy fatty acids, lithium salts, finely divided metal oxides, such as silica, alumina and ferric oxide, calcium carbonate and carbon black. Various other additives can be added to silicone fluids to improve the lubricity thereof, or provide greater corrosion resistance. Any of these or similar agents can be incorporated into the compositions of the invention.

It is conventional to add various fillers such as asbestos, glass fibers, metal oxides and the like to silicone resins in the preparation of reinforced laminates or molding compositions. It is also known that blowing agents can be added to silicone resins to produce a structural foamed resin. The present invention includes the incorporation of such materials in the organopolysiloxane-tetracyanoethylene composition.

Another aspect of the invention resides in the incorporation of tetracyanoethylene into otherwise conventional organopolysiloxane elastomers. In such systems, the conventional fillers and additives which are employed to strengthen the rubber or give it special properties can be present. Examples of such materials are amply illustrated in the prior art and include fillers $TiO_2$, ZnO PbO, MgO, $Fe_2O_3$, talc, glass fibers, clay and various types of silica.

The amount of tetracyanoethylene added to the organopolysiloxane is dependant upon the characteristics of a particular organopolysiloxane and the degree to which it is desired to enhance the thermal stability of the polymer. When no thickener or filler is present, the amount is preferably within the solubility limits of the siloxane. Generally, 0.1 to 5 weight percent, based on the weight organopolysiloxane, of tetracyanoethylene is effective. While greater than 5 weight percent can be used, it is presently uneconomical.

Any means capable of brining about an intimate and homogeneous dispersion of the tetracyanoethylene in the particular organopolysiloxane can be used. Where gums or greases are involved roll mills are suitable, while with fluids any relatively fast agitation equipment is sufficient. When the fluids are to be used as such, complete solubility of the tetracyanoethylene is desirable. Heating the mixture, e.g., to 150° C., usually helps in forming such a solution. A mutual solvent, for example, can be used.

The stabilized compositions of this invention are useful as lubricants, dampening fluids, hydraulic fluids, coating and molding compounds, structural resins gasketing, sealants and the other uses for which organopolysiloxanes are normally employed.

The following examples are only illustrative of the invention which is properly delineated in the claims.

EXAMPLE 1

Tetracyanoethylene (0.1 gm.) was added to 2 gm. of trimethylsiloxy-end-blocked dimethylpolysiloxane fluids having a viscosity of 6,000 cs. at 25° C. The mixture was heated at 250° C. for 4 hours. The tetracyanoethylene was completely dissolved in the polymer.

Thermograms indicated that untreated starting fluids (dimethylopolysiloxane) began to degrade rapidly in air at 320° C., whereas, the sample containing the tetracyanoethylene stablizer did not begin to decompose until a temperature of 370° C. was attained.

It is believed that polysiloxanes degrade at higher temperatures by siloxane rearrangement which results in the formation of volatile cyclic species and that the tetracyanoethylene is capable of forming a charge transfer complex which inhibits siloxane rearrangement.

EXAMPLE 2

The experiment of Eample 1 was repated except that 0.05 gm. of tetracyanoethylene were added to 2 gm. of the dimethylpolysiloxane and the mixture was heated for 4 hours at 250° C. Thermograms indicated thermal stability equivalent to the mixture of Example 1.

EXAMPLE 3

Trimethylsiloxy-end-blocked trifluoropropylmethylpolysiloxane, having a viscosity of 3000 cs. at 25° C., was treated with tetracyanoethylene (5 weight percent) by mixing and heating to a temperature of 150° C. over a period of 16 hours.

Thermogravimetic analysis showed that the untreated fluid started to decompose rapidly in air at 175° C., whereas, the treated fluid did not start to decompose rapidly until at a temperature of 240° C. Similar results were obtained when the thermogravimetric analysis was run in an inert (nitrogen) atmosphere.

Reasonable modification and variation are within the scope of the invention which sets forth novel stabilized organopolysiloxane compositions.

That which is claimed is:

1. A method of improving the thermal stability of organopolysiloxanes of the unit formula

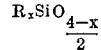

where R is a monovalent hydrocarbon radical or monovalent halogenated hydrocarbon radical, and $x$ has a value of from 0 to 3 inclusive, $x$ having an average value of at least 0.5, comprising adding to said polysiloxane from 0.1 to 5 weight percent, based on the weight of organopolysiloxane, of tetracyanoethylene.

2. The method of claim 1 where said organopolysiloxane is dimethylopolysiloxane.

3. The method of claim 1 where said organopolysiloxane is trifluoropropylmethylpolysiloxane.

References Cited

UNITED STATES PATENTS

| | | | |
|---|---|---|---|
| 2,794,824 | 6/1957 | Heckert | 260—465.8 |
| 3,166,584 | 1/1965 | Cairns et al. | 260—465.8 |

HOSEA E. TAYLOR, Primary Examiner

U.S. Cl. X.R.

252—49.6; 260—448.8